US006810354B1

(12) United States Patent
Dahlen

(10) Patent No.: US 6,810,354 B1
(45) Date of Patent: Oct. 26, 2004

(54) IMAGE RECONSTRUCTION METHOD

(75) Inventor: Gregory A. Dahlen, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 9 days.

(21) Appl. No.: 10/139,949

(22) Filed: May 6, 2002

(51) Int. Cl.[7] .............................................. G01B 15/04
(52) U.S. Cl. ...................................... 702/168; 702/167
(58) Field of Search ..................... 33/533, 556; 73/104, 73/105; 250/306, 307, 310; 382/199; 702/127, 155, 158, 166, 167, 168, 162

(56) References Cited

U.S. PATENT DOCUMENTS

| | | | | |
|---|---|---|---|---|
| 5,283,442 A | * | 2/1994 | Martin et al. ........... 250/559.22 |
| 5,376,790 A | * | 12/1994 | Linker et al. ................ 250/306 |
| 5,426,302 A | * | 6/1995 | Marchman et al. ......... 250/306 |
| 5,448,399 A | * | 9/1995 | Park et al. ................... 359/372 |
| 5,450,505 A | | 9/1995 | Keller |
| 5,496,999 A | * | 3/1996 | Linker et al. ................ 250/306 |
| 5,591,903 A | | 1/1997 | Vesenka et al. |
| 5,665,905 A | | 9/1997 | Bartha et al. |
| 5,705,814 A | * | 1/1998 | Young et al. ................ 250/306 |
| 5,877,891 A | * | 3/1999 | Park et al. ................... 359/372 |
| 5,939,719 A | * | 8/1999 | Park et al. ................... 250/306 |
| 6,000,281 A | | 12/1999 | Burke |
| 6,057,547 A | * | 5/2000 | Park et al. ................... 250/307 |
| 6,130,427 A | * | 10/2000 | Park et al. ................... 250/306 |
| 6,169,281 B1 | * | 1/2001 | Chen et al. .................. 250/234 |
| 6,265,718 B1 | * | 7/2001 | Park et al. ................... 250/307 |
| 6,489,611 B1 | * | 12/2002 | Aumond et al. ............ 250/306 |
| 6,518,570 B1 | * | 2/2003 | Hough et al. ............... 250/306 |
| 6,520,005 B2 | * | 2/2003 | McWaid et al. .............. 73/105 |
| 6,590,703 B2 | * | 7/2003 | Park et al. ................... 359/372 |

OTHER PUBLICATIONS

Yeo, Y.; Aumond, B.D.; Youcef–Toumi, K.; "Precision Atomic Force Microscope Imaging"; 5th International Conference on Signal Processing Proceedings, 2000; vol. 2; Aug. 21–25, 2000; pp 1180–1186.*

Journal of Research of the National Institute of Standards and Technology, vol. 102, No. 4, Jul.–Aug. 1997, "Algorithms For Scanned Probe Microscope Image Simulation, Surface Reconstruction, and Tip Estimation" by J. S Villarrubia.

* cited by examiner

Primary Examiner—John Barlow
Assistant Examiner—Douglas N Washburn
(74) Attorney, Agent, or Firm—Boyle Fredrickson Newholm Stein & Gratz S.C.

(57) ABSTRACT

A method of extracting the shape of a probe tip of a probe-based instrument from data obtained by the instrument is provided. The method generates an image using the data wherein the data is indicative of a characteristic of a surface of a sample. The method then calculates a slope of the image at a particular region and determines, using the slope, a probe contact point between the tip and the sample at that region. In addition, the method further includes the steps of translating the image point based on the probe contact point and repeating the above steps for at least two points in the image data so as to generate a corrected image plot.

62 Claims, 11 Drawing Sheets

IMAGE RECONSTRUCTION METHOD

BACKGROUND OF THE INVENTION

1. Field of the Invention

The present invention is directed to scanning probe microscopes, and more particularly, to a method of extracting the tip shape from data obtained by a scanning probe microscope.

2. Description of Related Art

Several known probe-based instruments monitor the interaction between a cantilever-based probe and a sample to obtain information concerning one or more characteristics of the sample. For example, scanning probe microscopes (SPMs), such as the atomic force microscope (AFM), are devices which typically use a sharp tip and low forces to characterize the surface of a sample down to atomic dimensions. More particularly, SPMs monitor the interaction between the sample and the tip on the cantilever of the probe. By providing relative scanning movement between the tip and the sample, surface characteristic data can be acquired over a particular region of the sample, and a corresponding map of the sample can be generated.

The atomic force microscope (AFM) is a very popular type of SPM. The probe of the typical AFM includes a very small cantilever which is fixed to a support at its base and which has a sharp probe tip extending from the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high resolution three axis scanner acting on the sample support and/or the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,226,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode.™ (TappingMode™ is a trademark of the present assignee.) In oscillation mode, the tip is oscillated at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

Notwithstanding the fact that scanning probe microscopes are high resolution instruments, the ultimate resolution of the data obtained by such probe-based instruments is limited by the physical characteristics of the tip of the probe itself. More particularly, there are limitations as to how small, and sharp, the tip can be made. In view of this, the tip shape is reflected in the acquired data, a problem that is exacerbated by the fact that AFMs often image very small (e.g., Angstrom scale) features. As a result, an error in the acquired data results and the corresponding accuracy of the surface image is significantly compromised. Hereinafter, the acquired SPM image will periodically be called the "dilated" image.

For some applications, this limitation may be negligible. However, for many applications, the degree of accuracy required to resolve the features of the sample surface is significantly greater, such that tip shape error is unacceptable. For instance, in the semiconductor fabrication industry, imaging features such as lines, trenches and vias with single nanometer accuracy is desired. These features may have dimensions in the range of 120 nm, and are continually getting smaller. With typical tip widths in the range of about 70 nm, the tip shape clearly introduces significant error in the data and must be removed to accurately image the sample surface.

Moreover, the aforementioned problems can be exacerbated by the fact that complex sample surface topologies require a commensurate increase in tip shape complexity to image such surfaces. For example, samples may include undercut regions where a particular x,y scan position may have multiple "Z" height values (see region "U" in FIG. 1, discussed in further detail below). Again, this is common in the semiconductor fabrication industry, and thus tips have been developed to allow imaging of such complex topographies. However, with the increase in tip shape complexity, there typically is a corresponding increase in error in the AFM data.

Two types of known tip shapes are illustrated in FIGS. 1 and 2. Note that probe tips, such as the CD tip, shown in FIG. 2, typically will not have the smooth symmetrical shapes illustrated in the figures. These tip shapes are merely presented as such to highlight the concepts and features of the preferred embodiment. In FIG. 1, a probe tip 10 of a traditional scanning probe microscope includes a parabolic, or other pointed shape that is relatively easy to characterize. Tip 10 includes a shaft 12 and a distal end 14 that although sharp is typically at least slightly rounded at its active surface 15. During a scan (operating in an oscillating mode, for instance), tip 10 interacts with a sample surface 16 to image characteristics of that surface. Tip-sample interaction is controlled, and data is collected, via a control system (not shown) as described previously. The collected data, in turn, may be plotted to image the sample surface. Importantly, this acquired image may not accurately reflect sample surface characteristics due to, among other things, the error introduced by the shape of the pointed tip.

In addition to introducing at least some tip shape error in the acquired data, probe tip 10 is unable to image certain surfaces. In particular, although suitable for many applications, based on its shape probe tip 10 is simply unable to accurately depict vertical sidewalls and undercut regions (which often exist in semiconductor fabrication, for example) in the corresponding sample surface topography. Notably, this is due to limitations in both the tip shape and the algorithms used to control tip position.

To be able to image surface features such as vertical sidewalls and undercut regions, AFMs having more complex probe tips have been developed. In one such instrument, shown in FIG. 2, an AFM employs active X-Z control to follow complex surface topography using a probe tip 20 having a shaft 22 and a distal end 24 including left and right protuberances 26, 28, respectively, in the scan (for example X) direction. By dithering the tip in the scan direction, protuberances 26, 28 are caused to interact with surface features such as vertical sidewalls. As a result, what before caused "shaded regions" (i.e., regions of no tip-sample contact such as undercut region "U" illustrated in FIGS. 1 and 2) in the acquired AFM data, now yields at least some data based on tip-sample contact. However, with this increase in flexibility of the types of samples that can be imaged, correcting and reconstructing the image data becomes increasingly difficult.

Overall, whether employing simple or complex probe tip shapes, the problem of the shape of the tip being convolved in the AFM data has been known and appreciated in the art. Although solutions have been attempted with some success, extracting tip shape errors from AFM data has been an inexact process. Moreover, as features become smaller, and because the tip is at least somewhat limited in just how small it can be made, the convolution of the tip in the image data becomes more substantial, and thus it is becoming increasingly important that the tip shape be removed for accurate measurements. Current solutions directed at minimizing tip shape problems provide insufficient accuracy when studying sub-nanoscale features having complex topographies.

In this regard, some known reconstruction techniques have been developed to provide a correction based on characterizing the shape of the tip. Once the tip shape is measured or estimated, it can then be "eroded" from the SPM sample image, for example, via mathematical morphology, thus yielding an improved "corrected" image. This is typically accomplished by removing or eroding the area (2-D; volume for 3-D) of the estimated probe tip shape for each position the probe tip occupies in the scan. However, such techniques are inherently limited. First, removing entire areas (volumes) of tip shape data is highly computationally intensive, even when the tip shape and sample topology are relatively simple adding to system expense and reduces efficiency. In addition, the point of contact of the active surface of the tip changes as the tip traverses a particular topography, and thus the tip shape that should be removed for different points may change, therefore potentially compromising image accuracy.

In general, when working with mechanical probe tips that are manufactured to such small scale, such processes are imperfect, and in any event, the resolution for many cases is unacceptable. And, although more accurate mathematical representations for complex tips and surface topologies are continually being attempted, any such technique will be prohibitively computationally intensive for the applications contemplated by the present invention.

In another known and widely used technique, particularly applicable to the above-described CD probe shown in FIG. 2, rather than applying typical shape "deconvolution" of the image to compensate for the effect of dilation of the image, a simple subtraction of the tip-width in the scan direction can provide improved reconstructed images and critical dimension measurements.

For this technique to provide a useful correction, the width of the CD tip must be computed to a high degree of accuracy. The way in which this is typically accomplished is by scanning a silicon nanoedge with, for example, the boot shaped CD tip shown in FIG. 2. Because the dimensions of the nanoedge are known or at least very closely approximated, the width of the tip can be extracted from the image data. This scan of a silicon nanoedge is illustrated in FIG. 3A. In particular, a CD tip (for example, 20 in FIG. 2) is scanned from left to right over an improved silicon nanoedge (ISNE) 31 so as to produce an image data profile 30. In this method, the width of the tip is calculated according to, $$W_{tip} = L - (W_1 + W_2) \quad \text{Equation 1}$$

where "L" is the total width of the acquired image a vertical distance "D" (defined below) from the plateau. $W_1$ and $W_2$ are defined as follows, $$W_1 = (D-r)\tan\alpha + r \quad \text{Equation 2}$$

and $$W_2 = (D-r)\tan\beta + r \quad \text{Equation 3}$$

In these equations, "D" is the distance from the plateau "P" of the scanned image used for measuring the angles $\alpha$ and $\beta$, as illustrated in FIG. 3. For example, this value may be approximately 800 angstroms. In addition, "r" is the radius of the vertex of the ISNE, estimated by SEM and/or sharp tip SPM analysis of the nanoedge, and is approximately 75 angstroms. The angles $\alpha$ and $\beta$ are the angles computed from the left and right side slopes, respectively, of the previous tip calibration analysis. Computing the tip width in this fashion, this prior art method can be used to subtract off that width from the image data generated during a scan to approximately correct for the error in the image data. Although providing a correction, this method has significant drawbacks.

First, by simply subtracting the tip width from the image data, it is assumed that the tip-sample contact is being made at a particular point, for example, at the vertical tangent of the protuberances of the boot shaped or CD tip (i.e., at point 29, FIG. 2). However, as the tip scans along a particular topography, the contact point of the tip on the sample translates along the surface of the tip and thus the effective width of the tip at the contact point changes. As a result, a single-valued tip width subtraction is inexact. By simply subtracting off a single value tip-width, an error remains in the reconstructed image as each feature of a unique tip shape cannot be fully accounted for in correcting AFM image data. These errors are directed to inaccuracies in the image of the sample surface shape for both topology and height (vertical error). Another significant drawback is that the width defined in Equations 2 and 3 set forth above are merely estimates for the actual tip width. As the samples to be imaged continue to demand greater resolution, these equations will become inadequate even for those applications where tip-width correction provides an acceptable correction.

Other techniques have been employed; however, each has drawbacks. In short, for the applications contemplated by the present invention, no known technique sufficiently accounts for the tip shape when reconstructing AFM image data.

In view of the above drawbacks with known systems, an improved method was desired to accurately account for tip shapes in dilated SPM data independent of the type of probe tip employed. In addition, the solution should be relatively simple, both to implement and computationally, so as to maximize system efficiency and keep system cost low. More particularly, the AFM field was in need of an improved method that efficiently applies an accurate correction factor to acquired AFM data, i.e., a correction factor that is easy to implement and is based on the actual tip shape as precisely as possible. In addition, for those systems/applications where tip-width subtraction is sufficient, a more precise equation to compute tip-width was desired.

SUMMARY OF THE INVENTION

The preferred embodiment overcomes the drawbacks of prior art systems by providing an algorithm that easily analyzes and corrects data from a scanning probe microscope. The invention is directed to an elegant implementation of an algorithm that reconstructs a sample surface from metrology data more accurately and efficiently than prior techniques having the same objective. Importantly, the present invention does so by taking advantage of the geometry of tip-sample contact which heretofore was unappreciated in the art of reconstructing SPM image data. Specifically, when the SPM tip is in contact with the sample, the tangent angle of the tip and the tangent angle of the surface are identical. The inventor exploits this relationship by using the tangent angle of an SPM image or 2D line scan to uniquely determine the point on the tip where contact was made with the sample. If the contact point is known, a tip dimension at this contact point can be used to correct the SPM image. In an alternative embodiment, an improved tip-width correction equation is presented, thus expanding the range of applications for which tip-width correction provides sufficiently accurate resolution. A simplified example of the preferred embodiment will make the general process clear, while more sophisticated details will be discussed later. The example assumes that the size and shape of the tip has been measured, and that a 2-dimensional SPM line scan (like a cross-section through the sample) has been acquired. Further, assume that in this example, the tangent angle at a single point in the SPM line scan is 70 degrees. The outside of the SPM probe can be examined to find a position on the tip that also has a 70 degree tangent angle. As a result, the preferred method exactly locates the contact point on the tip where the specified measurement was made. If there is more than one point on the tip with an angle of 70 degrees, the contact point will be selected by more sophisticated means, detailed later. The next step is to correct the SPM image using the knowledge of the tip contact point. For this, since we know the size and shape of the tip, we can look up or measure tip width at the specified contact point. Using this tip width at the specific contact point, we can correct the measured data and very accurately reconstruct the actual dimensions of the sample.

The preceding example was a simplified 2-dimensional example. In more detail, and generalized for 3-dimensions, the current algorithm analyzes dilated data acquired by a scanning probe microscope to identify a contact point of the tip of the probe on the surface of the sample being imaged. By knowing the contact point of the tip on the sample, an appropriate correction vector can be applied to the raw data, on a point-by-point basis, to reconstruct the surface image. The contact point is determined, preferably, by computing the slope of the raw image data to thereby determine a surface normal associated with the contact point. Note that hereinafter the "tangent plane" is a mathematical plane that is tangent to the surface at a given point, and the "surface normal vector" is the vector that is perpendicular to the tangent plane. The direction of the unit surface normal vector gives a measure of the local slope of a surface.

According to a first aspect of the preferred embodiment, a method of extracting the shape of a probe tip of a probe-based instrument from data obtained by the instrument is provided. The method generates an image using the data, wherein the data is indicative of a characteristic of a surface of a sample. The method then calculates a slope of the image at a particular region and determines, using the slope, a probe contact point between the tip and the sample at that region.

According to another aspect of this preferred embodiment, the method further includes the steps of translating the image point based on the probe contact point and repeating the above steps for several points in the image data so as to generate a corrected image plot.

In another aspect of this embodiment, the method includes the step of identifying a region of the image where there are at least two points of contact. The method also includes comparing a local curvature of the image to a maximum curvature of the tip. The region of at least two points of contact is where the local curvature exceeds the maximum curvature of the tip.

According to an alternate aspect of the preferred embodiment, a method of correcting tip shape error in data obtained by a scanning probe microscope (SPM) having a tip includes steps of using the SPM to generate the data, wherein the data is indicative of a characteristic of a surface of a sample. Then, the method includes determining a contact point of the tip on the sample at a particular point of the data.

In another aspect of this preferred embodiment, the determining step includes identifying a unit surface normal to the sample at the data point. In addition, the method includes comparing the unit surface normal to tip surface normals associated with corresponding points on an active surface of the tip, wherein the unit surface normal corresponds to a first tip surface normal. Moreover, the tip surface normals each have an associated correction factor. To reconstruct the image profile, the method further includes translating the data point using the correction factor corresponding to the first tip surface normal.

According to a still further aspect of the preferred embodiment, the determining step includes comparing the unit surface normal to tip surface normals associated with several points on an active surface of the tip. In this case, the tip surface normals are non-unique such that the unit surface normal corresponds to at least two of the tip surface normals. As before, the tip surface normals each have an associated correction factor, but in this case, the method includes the step of translating the data point using each of the correction factors associated with at least two tip surface normals.

According to another aspect of this embodiment, the method includes the step of repeating each of the previous steps for data points in a profile generated using the data so as to generate a first reconstructed image profile. The method further includes filtering the first reconstructed image profile so as to generate a second reconstructed image profile. This filtering step preferably includes selecting a point of the first reconstructed image profile that has a minimum Z height for several positions in the first reconstructed image profile.

According to another aspect of the preferred embodiment, a method includes correcting tip shape error in data obtained by a probe-based instrument having a tip. The method includes the step of using the instrument to scan a sample and generate a profile based on the data where the data is indicative of a characteristic of a surface of the sample and includes a plurality of data points. After a contact point of the tip is determined, the method includes determining a correction vector for several points of the data using the corresponding contact point.

According to another aspect of the preferred embodiment, a method includes extracting the width of a tip of a probe-based instrument from data obtained by the instrument. The method includes the steps of using specification end radii (or measuring the radii) of the tip to compute first and second end corrections and correcting the data by subtracting a width of the tip, which is dependent on the first and second end corrections. The first and second end corrections, $W_1$ and $W_2$ are equal to, $W_1 = ABS|-\cos(\alpha)(r+R_R)-\tan(\alpha)(D-r-R_R+\sin(\alpha)(r+R_R))+R_R$ and $W_2 = \cos(\beta)(r+R_L)-\tan(\beta)(D-r-R_L+\sin(\beta)(R+R_L))-R_L$ wherein "r" is the radius of the silicon nanoedge, "D" is a z distance from a plateau of a scanned image to the measured width height, alpha ($\alpha$) is an angle computed from a left side slope, beta ($\beta$) is an angle computed from a right side slope, and $R_L$ and $R_r$ are the radii of the left and right sides of the tip, respectively.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The preferred embodiments of the present invention are directed to methods of correcting image data obtained by scanning probe microscopes by accurately accounting for probe tip shape in reconstructing the image of the sample surface. More particularly, the preferred method determines the actual point of contact of the probe tip on the sample surface for several points in a dilated image profile, and applies a corresponding correction to the data so as to more accurately extract the tip shape from the dilated image profile. In an alternate embodiment, a method of improved tip-width correction is discussed.

Image Correction Using Point of Tip Contact Determination

Figure 4A:
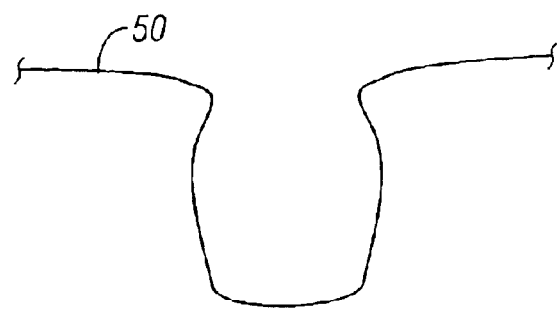
FIGS. 4A–4C are side elevational schematic views of a sample, an AFM image profile superimposed thereon, and a reconstructed image profile of the sample surface provided by the preferred embodiment, respectively.
Figure 4B:
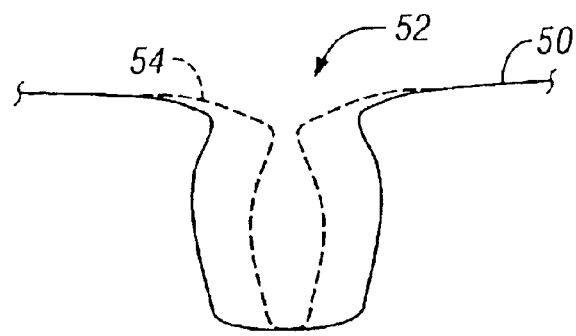
Figure 4C:
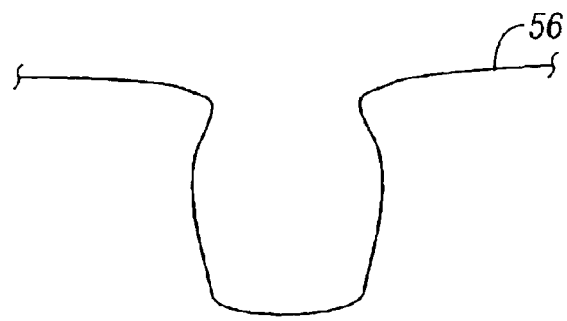

Turning initially to FIGS. 4A–4C, a sample 50 to be scanned by an AFM, as well as the resulting "raw" or dilated image data, are shown schematically together with the desired corrected image data. In particular, sample 50 shown in FIG. 4A includes a trench 52 produced according to a semiconductor fabrication process and having a particular height and width whose dimensions are in the nanoscale range. Notably, trench 52 has a relatively complex topography including vertical sidewall positions and undercut regions.

Figure 1:
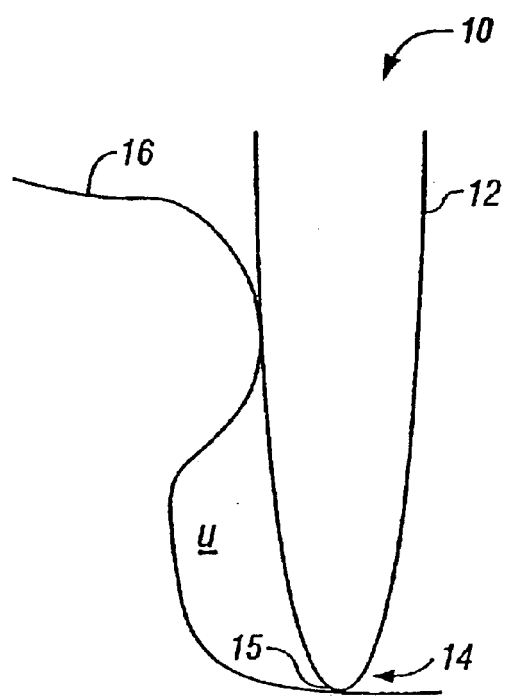
FIG. 1 is a side elevational schematic view of a prior art probe tip interfacing with a sample having a complex topography.
Figure 2:
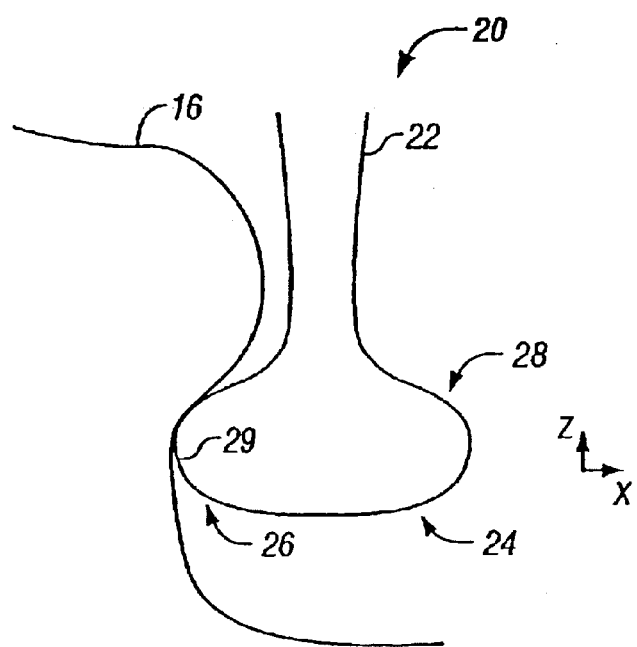
FIG. 2 is a side elevational schematic view similar to FIG. 1, illustrating a CD probe tip adapted to image sample surfaces having complex topographies.

Sample 50 is supported by on a sample holder of the SPM, so as to allow the sample to be engaged by an SPM tip (20 in FIG. 2, for example). As the SPM tip scans sample 50, image data is acquired and stored for further analysis by the user. This data profile 54 is illustrated in FIG. 4B as the dashed lines superimposed on the profile of sample 50 shown in FIG. 4A. Notably, the image 54 is dilated from the actual sample topography due to the fact that the shape of the tip is reflected in the data. The preferred embodiment operates to remove this error so that the dilation is essentially eliminated and a true image 56 of sample 50 under test can be obtained, as shown in FIG. 4C. Note that the preferred embodiment is based on tip sample contact, and that the reconstructed image will be dilated in those regions where no tip-sample contact occurs, e.g., when a dimension of the probe tip is insufficient to contact a sample having a severely undercut region (FIGS. 1 and 5).

To achieve the reconstructed image shown in FIG. 4C, the preferred embodiment implements a method whereby the geometry associated with the point of contact of the probe tip on the sample surface is exploited. Note that the principles of the preferred embodiment are presented herein using a CD tip. This is being done for illustrative purposes only, and the invention can be implemented when using probe tips of any shape.

Figure 5:
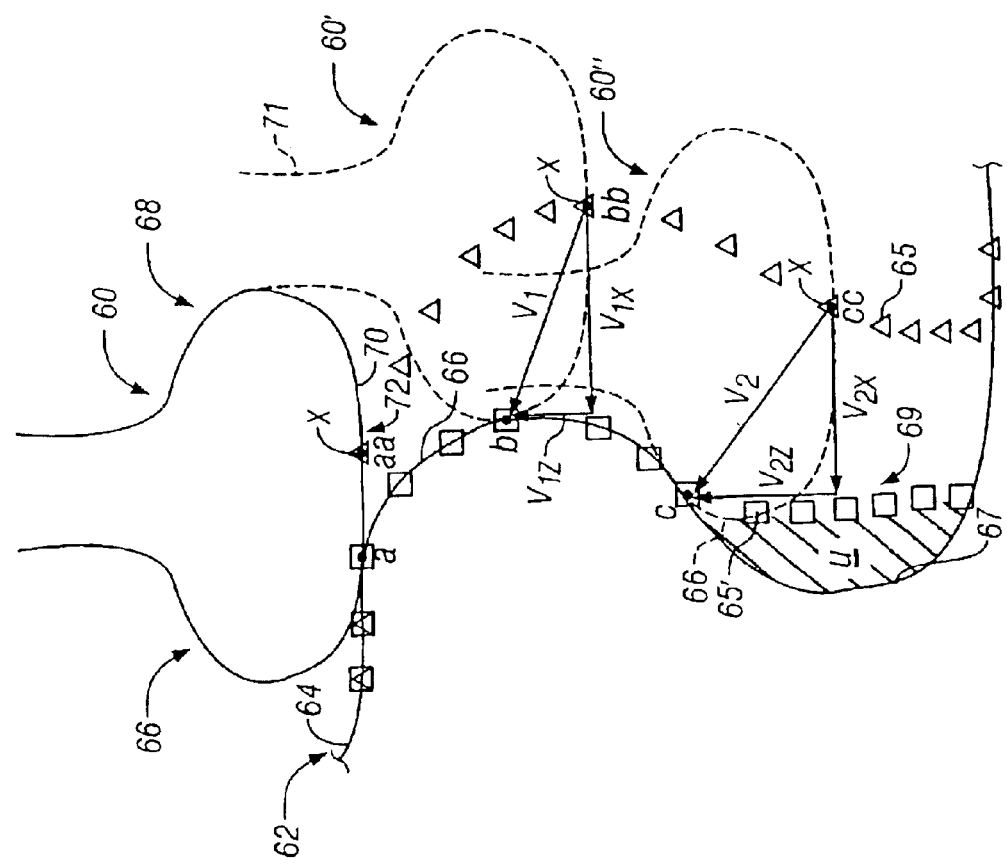
FIG. 5 is a side elevational schematic view of tip-sample contact at three separate positions during a scan, illustrating correction vectors obtained using the method of the preferred embodiment.

Turning to FIG. 5, a boot-shaped (CD) probe tip 60 of an AFM is scanned across a surface 64 of a sample 62. Probe tip 60 includes left and right protuberances 66, 68, respectively, that along with bottom surface 70 of a distal end 72 define the active regions of tip 60. The scan shown was conducted from upper left to lower right along a trench wall 66, thus obtaining the data represented by the series of triangles. Notably, the acquired data represented by the triangles is the dilated data that must be corrected to account for the shape of tip 60.

It is important to note that the dilated data (illustrated by the series of triangles) is generated using a fixed reference point for tip 60, for example, the mid-point "x" of tip 60 at its distal end 72. Importantly, this reference point "x" is typically displaced from the contact point of tip 60 on the sample surface 64, the contact point itself translating along the surface of tip 60 as a scan progresses, as noted previously. As the tip interacts with the sample surface, the reference point translates in the scan direction to generate the dilated image corresponding to surface characteristics of the sample.

With continued reference to FIG. 5, probe tip 60 is shown in three positions as it progresses from left-to-right in the scan direction. Like pairs of letters, for example, a-aa, represent the point of contact between probe tip 60 and sample 62, and the corresponding position of the selected reference point (i.e., "x") on the AFM tip used to produce the dilated image profile, respectfully. As such, notably, the distance and direction (i.e, vector) between the points of each pair (e.g., a-aa, b-bb and c-cc) is the amount by which the AFM image data must be corrected to produce the desired reconstructed image. The preferred embodiment provides this correction, as illustrated by the series of square blocks in FIG. 5.

Two of the correction vectors applied according to the present invention are shown. When it is at position 60', tip 60 contacts sample 62 at point "b," and reference point "x" is at "bb." The preferred embodiment operates to correct the difference between these two points (i.e., the dilation) by analyzing tip-sample surface normals (described below) to identify a correction factor, for example, a correction vector $V_1$, having orthogonal components $V_{x1}$ and $V_{Z1}$. Similarly, when tip 60 is at position 60", it contacts sample 62 at point "c," thus generating data image point "cc." Method 80 (FIG. 7) operates to determine and apply correction vector $V_2$ to translate point "cc" to "c," Thus extracting the shape of tip 60 at the contact point "c" from the dilated image.

As discussed in further detail below, the vertical portion of the dilated image data, and the corresponding vertical portion 69 of the reconstructed image (i.e., square blocks) at about the undercut region "U" of sample 62 is caused by a shaft 71 of tip 60 contacting surface 64 of sample 62 at about point "b" of sample 62. In other words, left side 66 of tip 60 does not contact sample 62 at about point 65 of the image data. As a result, with shaft 71 contacting the overhang, the portion of the undercut region "U" to the left of the vertical line of square blocks (i.e., corrected data) is "shaded," due to no tip-sample contact in that region.

Figure 6:
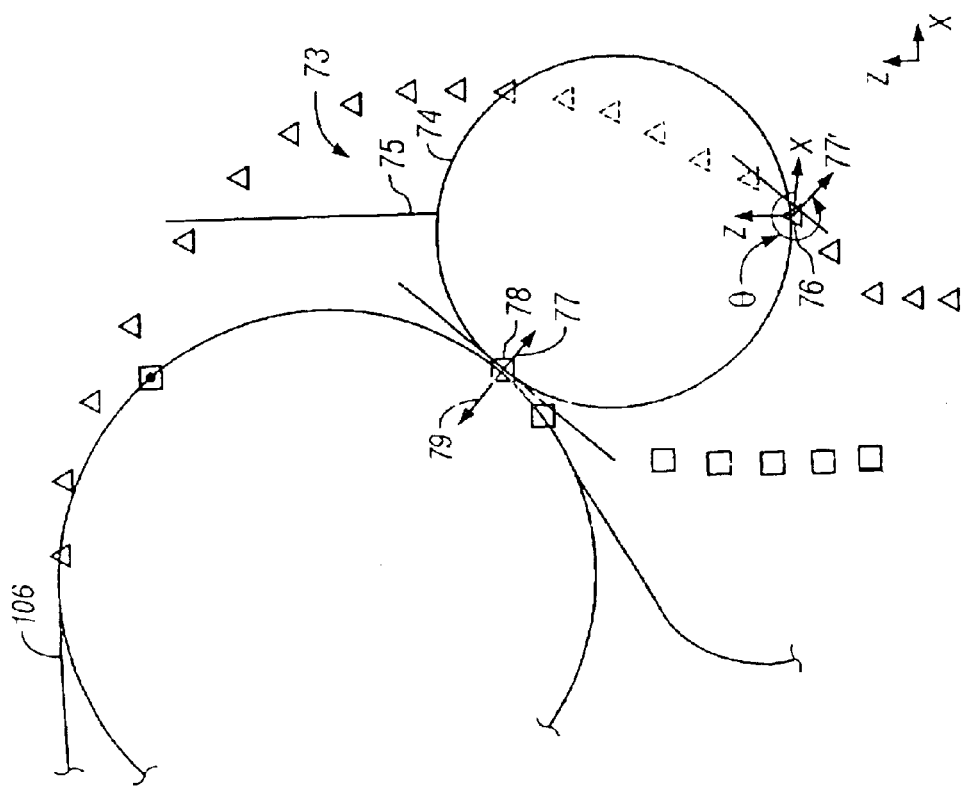
FIG. 6 is a side elevational view schematically illustrating tip-sample contact at a particular point.

Turning to FIG. 6, the geometry of tip-sample interaction during AFM data acquisition is shown. To illustrate this geometry for any particular point of contact between probe tip 74 (schematically shown coupled to shaft 75 of probe 73) and sample 106, sample 106 and probe tip 74 can be shown idealized in 2-D cross-section as circles, whereby a point of contact 78 sits in a tangential plane at the interface of the two structures. Importantly, at point of contact 78, the surface normals 77, 79 to the tangential plane are equal (and opposite) for sample 106 and probe 73, respectively. When utilizing a tip that has a shape defining surface points characterized by a series of unique surface normals (as in FIG. 6), these surface normals can be compared to the AFM image data to identify the exact point of contact of the tip on the surface. Note that "equal surface normals" indicates that the normals extend in the same direction.

More particularly, the tip shape at each point is reflected in the data recorded by the SPM as the slope of the data at that point. By computing the slope of the SPM image data (for example, relative to the scan direction or the X axis of the X-Z plane) and knowing the scan direction, the image unit surface normal at point 76 is 77'. At the tip sample contact point, the sample unit surface normal 77 is the same. And, with this information, the point of contact of the tip on the sample can be determined. Again, the surface normal 79 associated with the probe tip contact point will be equal and opposite to the sample unit surface normal 77. By knowing surface normal 79, an appropriate correction vector (previously computed upon characterization of the probe tip) associated with surface normal 79 can be applied to point 76.

For example, with continued reference to FIG. 6, projecting unit surface normal 77 to dilated image point 76 yields sample unit surface normal 77' which can be identified by measuring the angle θ it defines relative to the scan (X) direction, or about 315°. The probe tip surface normal 79 at this point is equal and opposite and thus is about 135° relative to the scan direction. Because the contact points of the probe tip are initially characterized and stored (in this case, according to the angle their corresponding surface normal makes to the scan direction), and corresponding correction factors have been computed, the appropriate correction factors can be readily determined and applied to the dilated data point. In this case, the point on the tip that has a surface normal that is 135° relative to the scan direction will be stored as such with an appropriate correction factor, for example (−4 nm, +7 nm) in the X-Z coordinate system.

As highlighted previously, as the SPM continues to scan the sample, the point of contact translates along the tip surface, thus typically defining a new tangential plane, and a new surface normal. Because the present invention is able to determine this point of tip contact at each point in the scan data (assuming unique surface normals associated with the active region of the tip), appropriate correction vectors for each scan point can be determined and a reconstructed image of the sample surface can be generated. As a result, the dilation error introduced by the tip shape is essentially eliminated.

In sum, because the tip shape is convolved in the SPM image data and the surface normal of the contact point of the tip is equal and opposite to the sample surface normal at that point, the point of contact of the tip on the sample can be determined. This is achieved by computing the local slope of the SPM image data which corresponds to the single point of contact of the tip on the sample, and then by identifying a corresponding surface normal. As correction vectors associated with the identified surface normals are determined using the data corresponding to the point of tip contact on a point-by-point basis, a reconstructed image having a high degree of accuracy can be achieved in a way that is not computationally intensive.

Figure 7:
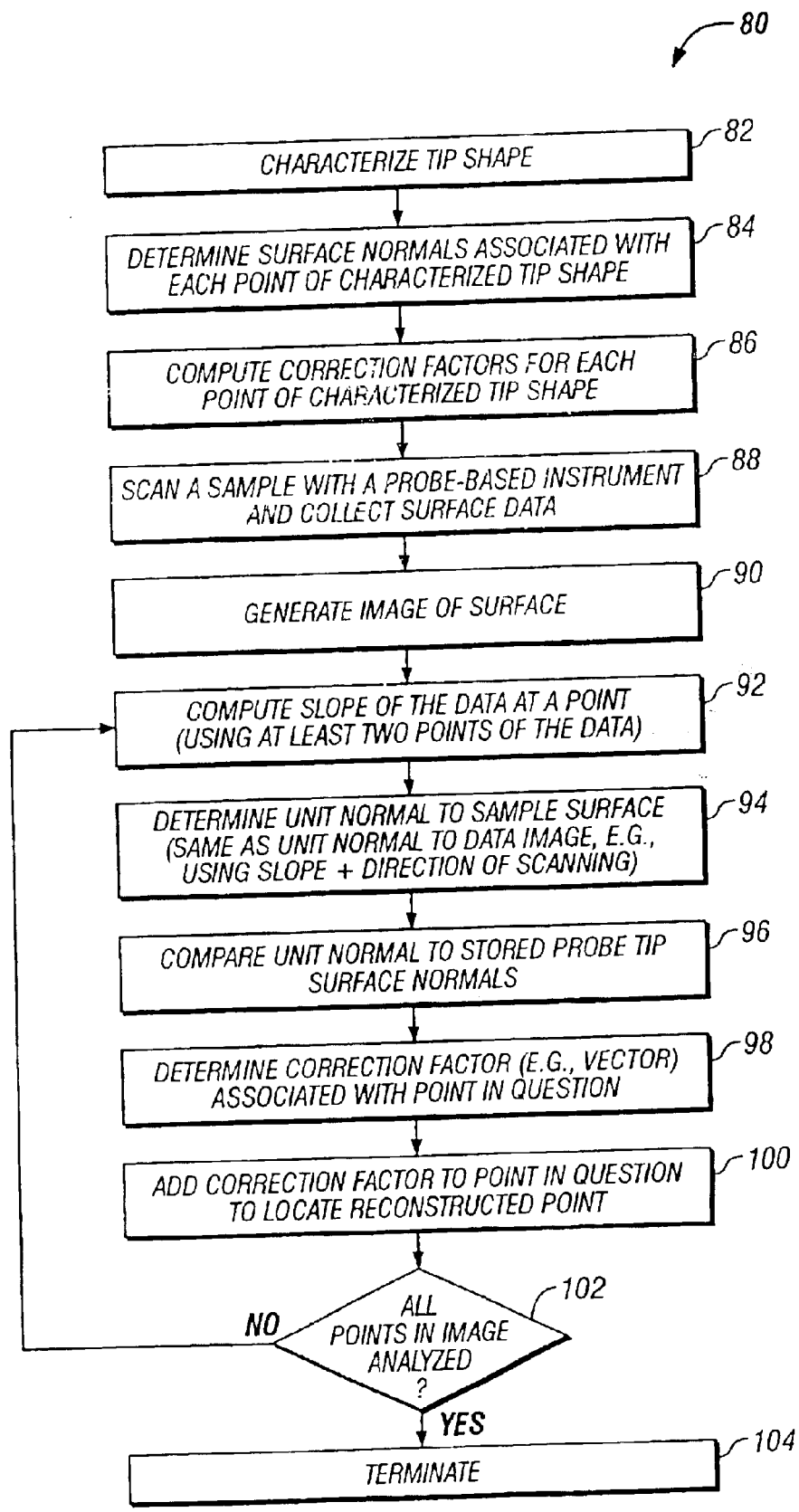
FIG. 7 is a flow diagram illustrating a method of the preferred embodiment.

In this regard, a method 80 of the preferred embodiment is shown in FIG. 7. Initially, in Step 82, the shape of the tip employed is characterized. More particularly, the potentially active regions of the surface of the tip are characterized on a point-by-point basis using any one of a number of techniques. For example, Step 82 may include scanning the tip over a calibration structure that allows reconstruction of the probe tip geometry. One type of calibration structure is an improved silicon nanoedge (ISNE) discussed above in conjunction with known tip-width correction techniques. The ISNE may be placed on a scanning sample holder that is positioned in a chamber of, for example, a scanning probe microscope (SPM) that allows imaging of the sample without loading or unloading. The ISNE has a known height (e.g., h=0.8 microns±0.2 microns), a known radius (e.g., r=7.5 nm±2.5 nm) and a vertex angle α which is about 8°±1°.

The resulting image is then used to determine tip width and can be used to define the shape of the lower tip section (i.e., the active region of the probe tip). We discuss the ISNE in further detail below in the section of description of the preferred embodiments entitled "Improved Tip Width Correction" in the context of computing the tip width of, for example, a CD or "boot shaped" probe tip. Calibration structures with lateral protuberances can also be used to further define re-entrant features on the probe itself, such as the undercut region of the CD probe tip. One such structure with lateral protuberances is the "flared silicon ridge" (FSR) which may take on the form of an FSR line (FIG. 3B) or an FSR trench. Yet another alternative for the ISNE is a vertical parallel structure (VPS) which may be used to determine the width of the tip. Typically, using the VPS (FIG. 3C), maximum repeatability in tip width measurement is achieved. The structure can be used for periodic checks while in production to verify the tip width value and the vertical calibration (Z piezo scale factor) of the SPM.

Rather than using calibration structures, a scanning electron microscope (SEM) may be utilized to image the probe to define the geometry of the probe. However, when imaging down to the nano and angstrom scales, SEM resolution is compromised and may be unsuitable for the applications contemplated by the present invention. In still another alternative, the nominal dimensions of the probe tip that are provided by the probe manufacturer may be used to characterize the tip shape in Step 82. The characterization of the tip shape for correction vectors may be based on discrete points or use of equations, for example, polynomial or trigonometric equations that can be applied to correct the dilated image.

Figure 16:
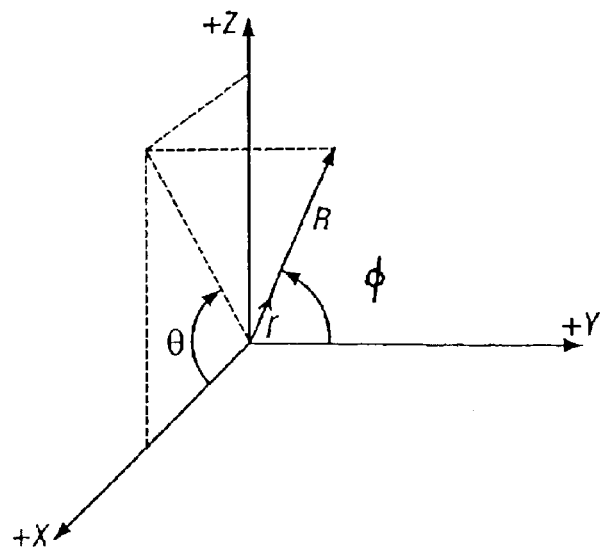
FIG. 16 is an orthogonal coordinate system illustrating the angles associated with the dimensional correction vector, according to the preferred embodiment.

Independent of the particular implementation of the characterization Step 82, the next step, Step 84, is to determine surface normals associated with several points on the active region of the surface of the probe. These surface normals extend orthogonally outwardly from the surface of the probe tip. Preferably, the surface normals are compiled as corresponding to particular angles θ (FIG. 6) in X-Z space to identify the characterized points or regions of the tip surface. For three dimensional X-Y-Z space, as shown in FIG. 16, θ and a second angle, φ, are used to define the surface normals, where r is 0 to ∞, θ is 0 to 360°, and φ is 0 to 180°.

After the tip shape is characterized, appropriate correction factors are determined for each point or region of the active portion of the probe tip in Step 86. These correction factors are computed relative to a reference point of the probe tip, i.e., the point of the tip used to plot the image data acquired by the AFM. These correction factors may be a convenient ΔX and ΔZ (see FIG. 6) (or ΔX, ΔY, ΔZ in X-Y-Z space) of a correction vector, or more complex equations associated with the characterized point or region. The correction vectors are then compiled, together with their associated surface normals, and stored for ready access and application during image reconstruction. For example, the array of surface normals may be stored in a look-up table along with the corresponding correction vectors for ready access during image reconstruction.

Then, in Step 88, a scan of a selected sample with a scanning probe microscope, such as an AFM, is begun. Note that each of the previous steps 82–86 are probe specific and are preliminary to the primary function of the preferred embodiment which is to reconstruct dilated surface data. In Step 90, method 80 optionally generates an image profile of the sample surface as the scan is conducted. Of course, this is the dilated data obtained by the AFM, i.e., the uncorrected data. A "smoothing" step may be implemented at this point to provide a "cleaner" profile and thus facilitate the computations of the remaining steps, including determining slope and curvature.

Figure 8:
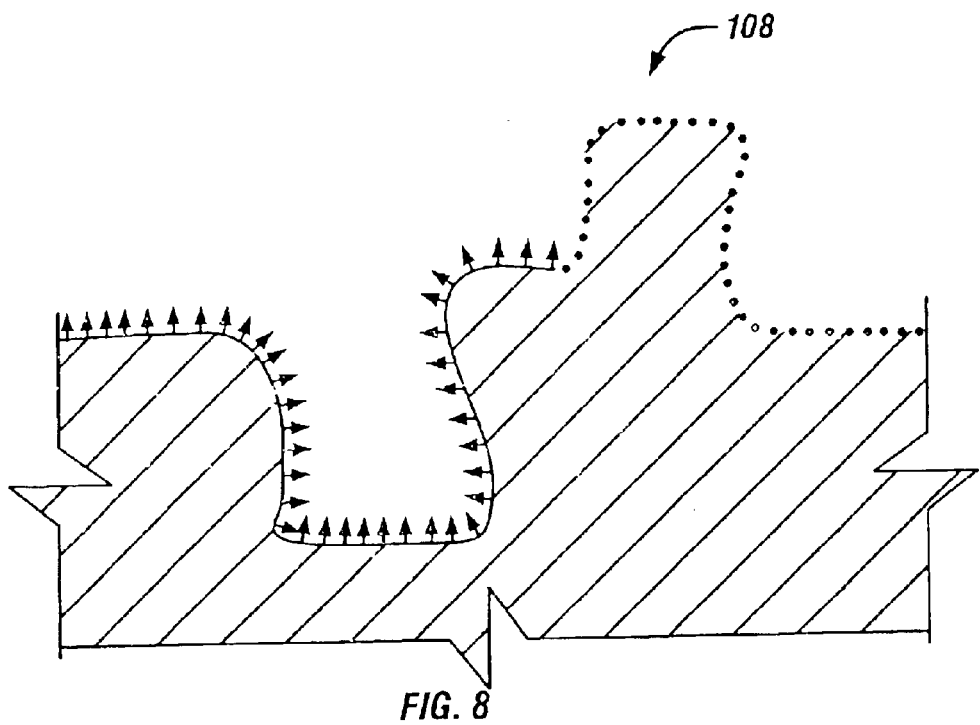
FIG. 8 is a side elevational schematic view of an image profile illustrating that unit surface normals associated with the sample are directed away from the interior of the sample.

Next, method 80 computes the slope of the image profile for a region (e.g., associated with a point) along the profile using at least two points of the acquired raw data in Step 92. This slope may be measured relative to the scan direction (X axis) as ΔZ/ΔX when correcting two-dimensional data. Similarly, for three-dimensional data, the slope of the tangential plane described previously may be measured relative to the XY plane. In Step 94, method 80 determines the unit normal (77 in FIG. 6) to the sample surface for that point based on the slope and the direction of scanning. Notably, with respect to the direction of scanning, the sample unit surface normal is directed away from the "interior of the sample," for example, to the left when scanning and processing the image profile from left to right. Sample unit surface normals are illustrated in FIG. 8 for several of the evenly spaced data points of an AFM profile 108.

Thereafter, in Step 96, method 80, via an angle θ in a look-up table for example (2-dimensional; θ and φ (FIG. 16) for a 3-dimensional table), compares the unit normal associated with the dilated data (Step 94) to the stored surface normals associated with tip characterization. In Step 98, method 80 determines an appropriate correction factor associated with the unit normal for that point. Again, this determination is made based on the characterization of the tip shape (Step 82).

Knowing the appropriate correction factor (e.g., vector) for the current point of the image profile, method 80 plots a point of a corrected image profile (i.e., reconstructed image) in Step 100. Then, method 80 asks whether all points in the dilated image profile have been considered in Step 102. If not, Steps 92–100 are repeated for at least several points in the image profile to build the corrected image profile, i.e., the profile that more closely resembles the actual sample surface. In Step 104, method 80 terminates when all points in the profile have been considered. Alternatively, correction vectors may be determined for several points of the image profile and then the points may be assembled into a corrected image profile for presentation to the user. Notably, as described in further detail below, in the case of tips that have non-unique surface normals, more than one correction factor may be applied to a point in the dilated data.

Notably, method 80 is not limited to the use of surface normals (Steps 94 and 96) for identification of an appropriate correction factor (vector) based on slope. For instance, the slope of the image data may be used directly with the knowledge that the left side of the probe makes contact while z is descending in a left to right processing of the data points and the right hand side of the probe is active when z is ascending. This logic is reversed when processing the sequence of data points from right to left.

The above-described algorithm is particularly suited for correcting SPM data when imaging with tips having shapes with surfaces that have unique surface normals (i.e., where the normal at each point along the contact or active surface of the tip defines a particular or unique angle with respect to a selected reference), such as the conventional parabolic AFM tip shown in FIG. 1. However, when imaging with tips that have more complex shapes that may have multiple surfaces described by the same (non-unique) surface normal, the point of contact is more difficult to determine. Therefore, to accommodate tip shapes such as that shown in FIG. 2, for example, the inventor has developed modifications to algorithm 80.

Figure 9:
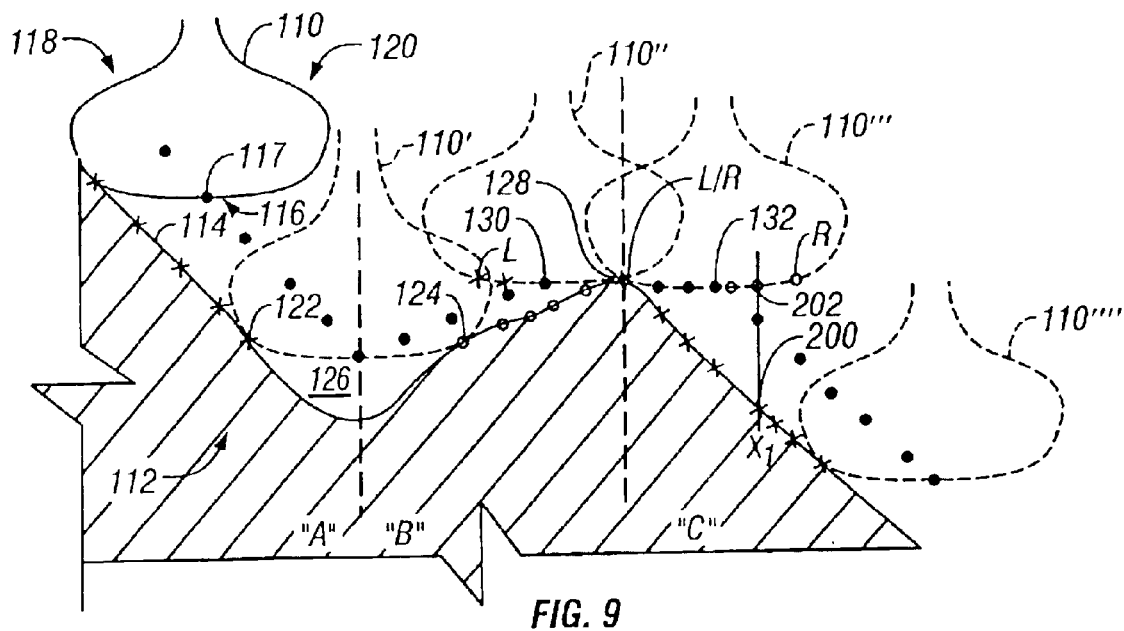
FIG. 9 is a side elevational schematic view of a dilated image profile using a tip having non-unique surface normals, illustrating reconstructed points determined according to the preferred embodiment.

One example of correcting dilated two-dimensional SPM data when using a probe tip 110 having non-unique surface normals is illustrated in FIG. 9. The surface normals are non-unique because, for instance, all surface points along the bottom surface of tip 110 between active probe tip points labeled "L" and "R" have the same surface normals extending orthogonally downwardly from the flat bottom.

In this example, tip 110 having a left side 118 and a right side 120 is shown being scanned over a surface 114 of a sample 112 from left to right. The series of dots, •, represent the dilated "raw" data acquired by the AFM using the center point 117 of a distal end 116 of the tip as a reference. A dilated image results.

For the dilated image data corresponding to the regions of the sample marked "A," "B" and "C," the dilated image data is corrected differently. Using the algorithm described previously, for at least several points in the dilated image represented by the series of dots in the region of the sample surface marked "A," the preferred embodiment will correctly determine the point of tip contact on the sample surface 114 (computing slope and determining the unit surface normal) with method 80, and thus is able to correct the dilated image data by applying an appropriate correction factor to that point in the dilated image. Again, the appropriate correction vector is the correction vector corresponding to the surface normal at the determined point of tip contact. Notably, for region "A," the point of tip contact is clearly on the left hand side of CD tip 110.

At the interface between region "A" and region "B," there is an abrupt change in the slope of the dilated data. As discussed in further detail below, there are several potential causes for this. In this case, it is two-point contact between the tip and the sample surface at points 122 and 124, as shown in FIG. 9. In other words, the width of tip 110 is too broad to contact the "valley" region 126 at the interface between region "A" and region "B." As a result, without further enhancement of the reconstructed image (described below, FIG. 12), the shape of the valley region of sample surface at the A–B interface is "shaded."

Notably, at this interface point, tip-sample contact transitions from left side 118 of tip 110 to right side 120 of tip 110. Therefore correction vectors switch from being directed to the left in region "A" to being directed towards the right in region "B." This is represented symbolically in FIG. 9 where the circles represent the corrected data points obtained from active probe points on the right side 120 of tip 110, while the cross ("X") marks represent the corrected data points obtained from active probe points on the left side 118 of tip 110.

Continuing from left to right, at the interface between the regions marked "B" and "C," a peak 128 in the sample surface 114 is present. When tip traverses peak 128, the first dilated data point is at about 130, where probe surface point "R" contacts peak 128. As the scan continues (left-to-right), tip 110 makes contact with peak 128 at several points on the surface of tip between "L" and "R," each having the same downwardly extending orthogonal surface normal. This is reflected in the dilated data (again, dots) between points 130 and 132 moving left to right. This flat portion of the dilated image between points 130 and 132 extends horizontally for a distance approximately equal to the distance between "L" and "R" for relatively sharp vertical protuberance in the sample 114.

Because each of these image points has the same unit surface normal (extending orthogonally upwardly, i.e., corresponding to a tangent that has zero slope), the stored "point of tip contact" data relating to that surface normal will not accurately identify the actual point of contact as it moves between points "L" and "R" As a result, method 80 will not supply a proper correction factor to reconstruct the surface. The present design has taken this into account with an alternate method.

Figure 10:
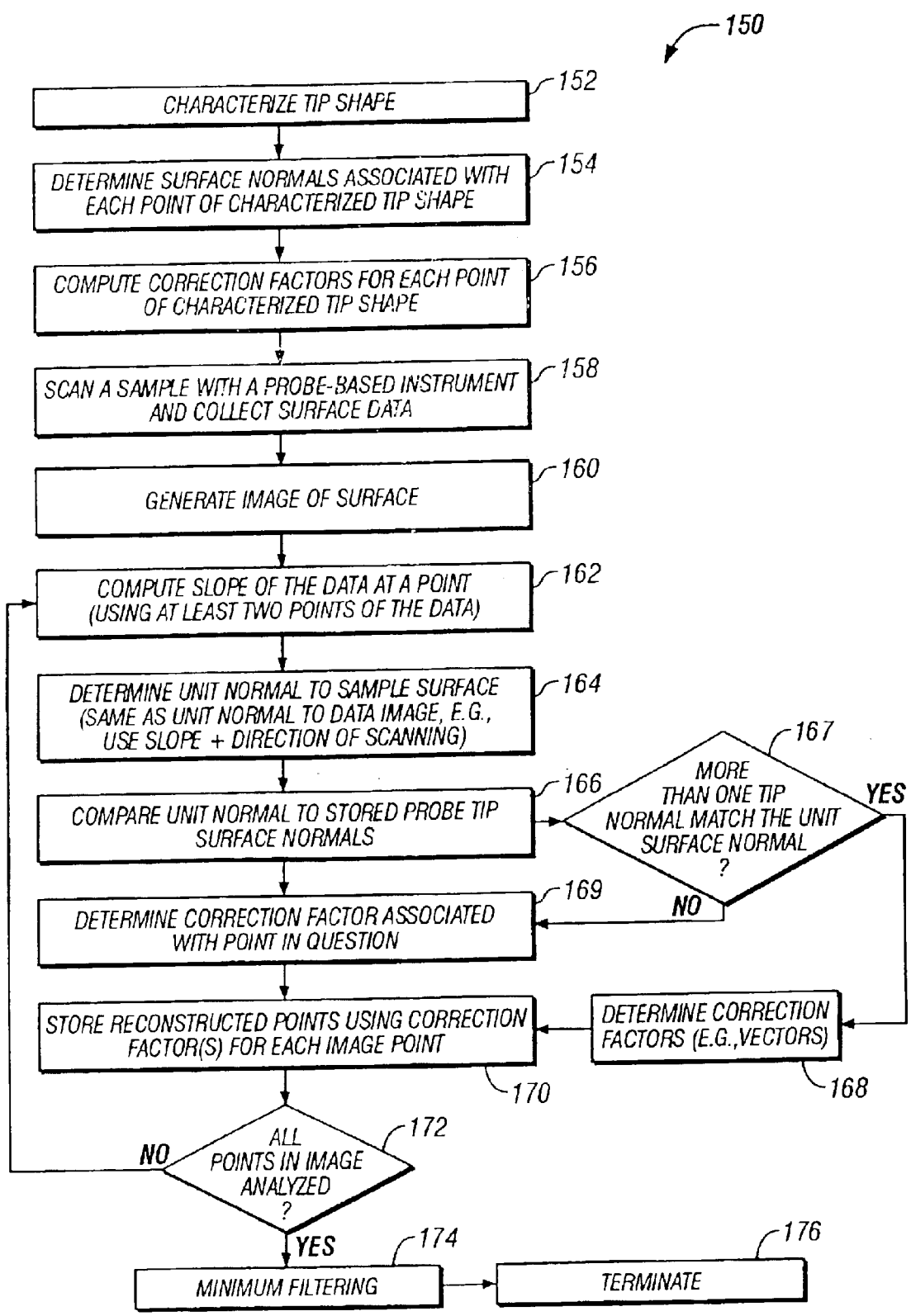
FIG. 10 is a flow diagram illustrating an alternate method of determining correction vectors when employing a tip having non-unique surface normals, such as that shown in FIG. 2.

A method 150 according to this alternate preferred embodiment is illustrated graphically in FIG. 9 and described in conjunction with the flow diagram of FIG. 10. Initially, in Step 152, the shape of the tip employed is characterized using any one of the number of techniques described previously. Examples of possible techniques to characterize tip shapes are described above in conjunction with FIG. 7 (Steps 82 of method 80). After the shape of tip 110 is characterized, surface normals are determined in Step 154 and corresponding correction vectors are computed in Step 156, a scan of a selected sample with the AFM is conducted in Step 158, as shown and described above in conjunction with FIG. 7. Then, in Step 160, the method generates an image profile of the sample surface. What results is raw or "dilated" data which requires correction. Next, as in method of FIG. 7, the method computes the slope of the image profile for a first point of the profile using at least two points of the dilated data in Step 162. Notably, the slope is measured relative to the X axis (AZ/AX for the case of correcting two-dimensional data). Again, as noted previously, for three-dimensional data, the slope of tangential plane is measured relative to the X-Y plane.

Thereafter, the method 150 determines the unit surface normal of the sample at the image point being processed in Step 164, similar to method 80. In the next step, Step 166, a comparison of the unit surface normal is made with the compiled data corresponding to the surface normals of the tip (characterized in Step 152). In the case between data points 130 and 132 in FIG. 9, the unit surface normals of the dilated image data in this region all have infinite slope (i.e., extend orthogonally upwardly). These unit surface normals could correspond to any one of the surface normals associated with the points on the flat bottom portion of distal end 116 of probe tip 110 (between points "L" and "R") as each has infinite slope (although in an opposite direction, i.e., extending orthogonally downwardly). Again, because tip 10 has surface points that define non-unique surface normals, method 80 does not provide an appropriate correction factor for the dilated data continuously spanning the border between "B" and "C" regions shown in FIG. 9.

In this case, the preferred solution is to first determine whether the unit surface normal associated with the dilated data corresponds to a unique surface normal associated with the probe tip (Step 167). If not, in Step 168, two (or more) correction vectors are determined, one for each of two designated active points on the flat region of tip 110. In this case, preferably the end points of the flat region of the probe, i.e., points "L" and "R" shown in FIG. 9. These two correction factors are then applied to the data point in question in Step 170 and plotted in the generation of a preliminary reconstructed image. In other words, two (or more) reconstructed points are plotted for such data points. However, in the case that the point in the image profile defines a surface normal that is unique to a single point on the sample surface, the method 150 (like method 80) generates an appropriate correction vector in Step 169 prior to plotting (and/or storing) the corrected data point in Step 170.

Next, in Step 172, method 150 determines whether all points in the selected section of the image profile have been analyzed and an appropriate correction vector (or vectors) applied. If not, Steps 162–170 are repeated for additional points of the profile. Then, in Step 174, method 150 conducts a "minimum filtering" function to accurately reconstruct the surface of the sample based on the corrected data. Minimum filtering is employed because it is known that the correct reconstructed point will be the one with the lowest corresponding Z-value for any particular X position, as the sample is always below the tip. More particularly, method 150, in Step 176, analyzes each "X" position in the preliminary reconstructed image, and determines whether there is more than one data point associated with that "X" position, approximately, of the preliminary reconstructed image. If so, the method selects the corrected data point having the smallest vertical or "Z" value, and discards any other point associated with that "X" position.

For the preliminary reconstructed image shown in FIG. 9, where both crosses ("x") and circles ("o") corresponding to left hand and right hand reconstructed points, respectively, exist, the correct reconstructed point will always be a minimum of those correction points at any particular "X" position of the image to more accurately approximate the actual sample surface. As an example, looking at X position "$X_1$" along the slice in FIG. 9, a left hand reconstructed point 200 and a right hand reconstructed point 202 are plotted. In this case, left hand reconstructed point 200 is kept, while right hand reconstructed point 202 is discarded because point 200 has an associated Z value that is less than the right hand reconstructed point 202. In this fashion, a reconstructed image profile that more closely resembles the actual sample topography is generated.

It is important to note that the image data points that cause at least two reconstruction points to be determined in Step 168 are preferably highlighted in some fashion so the program understands that these points are candidates for the minimum filtering step. Otherwise, if a minimum Z-height filtering step were performed on a scan position of the reconstructed image having two points that, although having different Z heights, are legitimate and should comprise points in the final reconstructed image, the lesser of the two points in terms of Z height would be discarded. For example, this would be the case for reconstructed points 188 (corresponding to an undercut region) and 196 in FIG. 12 (described below), which have the same "X" or scan position but different Z heights, both legitimate.

Method 150 is not limited to the use of surface normals (Steps 164, 166 and 167) for identification of an appropriate correction factor (vector) based on slope. For instance, the slope of the image data may be used directly with the knowledge that the left side of the probe makes contact while z is descending in a left to right processing of the data points and right hand side of the probe is active when z is ascending. This logic is reversed when processing the sequence of data points from right to left.

Figure 11:
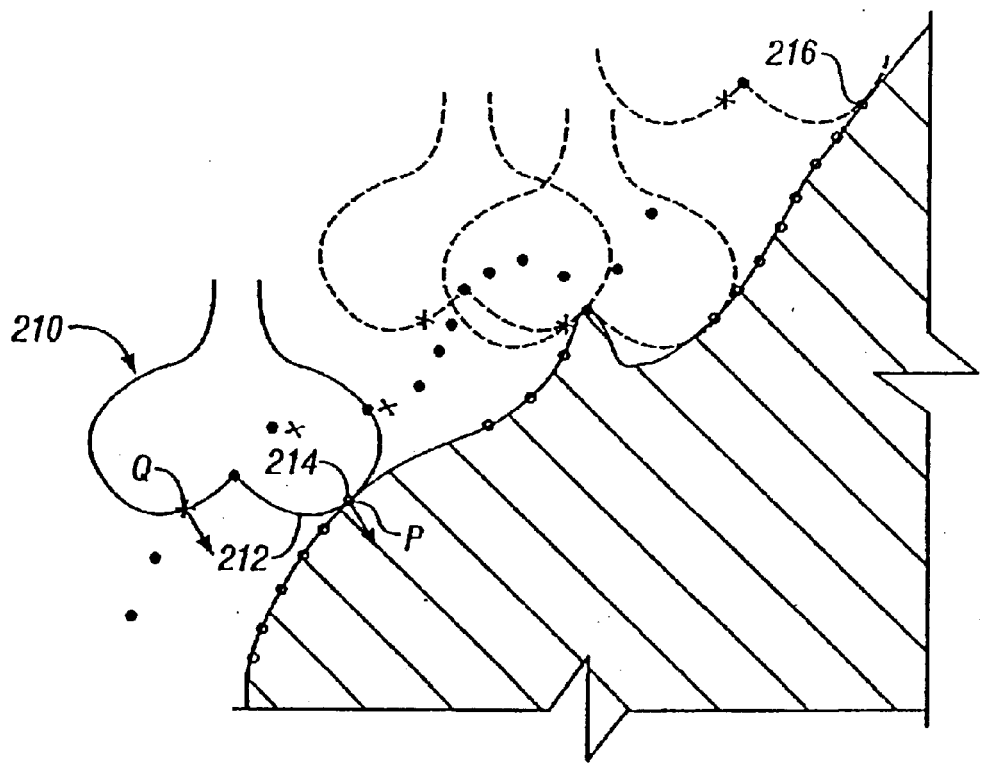
FIG. 11 is a side elevational schematic view providing another illustration of the method of FIG. 10 when employing a CD tip having a concave-shaped distal end.

Turning to FIG. 11, in another example of a probe having at least one non-unique surface normal, a CD probe tip 210 having a concave bottom surface 212 is utilized to scan a sample. Similar to the flat bottomed CD tip 10 that includes non-unique surface normals, surface normals at points Q and P shown in FIG. 11 are non-unique. Again, when implementing the algorithm of the preferred embodiment, without further modification, method 80 (FIG. 7) is unable to determine the point of contact on the CD tip when either Q or P contacts the sample surface (such as at 214 or 216 in FIG. 11). Fortunately, the algorithm described in conjunction with FIG. 10 can be utilized to determine the appropriate correction factor. All the appropriate correction factors are computed and plotted as a reconstructed image ("Xs" representing left side correction factors and "Os" representing right side correction factors), including generating two correction factors for dilated image points that have a unit surface normal that is equal and opposite to a surface normal associated with more than one point on the surface of the tip 210 in Step 168 (for ease of presentation, not all reconstruction points "X" and "O" are shown). Then, the minimum Z corrected point associated with each scan position of the reconstructed image is selected in Step 174 of method 150. Utilizing this minimum Z height filtering, an accurate reconstructed image can be obtained utilizing even such complex probe tip shapes as that shown in FIG. 11.

Figure 12:
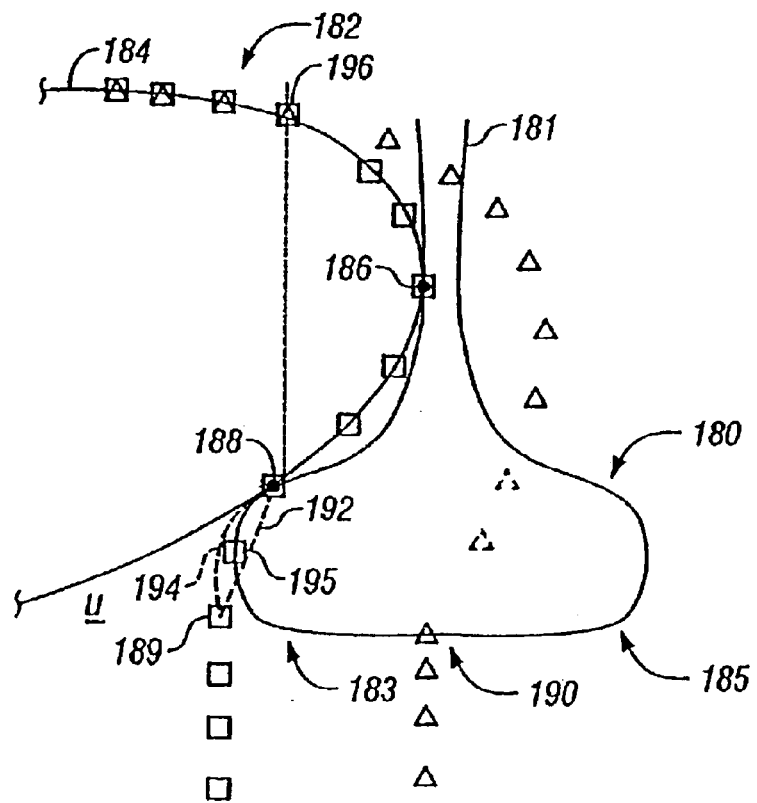
FIG. 12 is a side elevational view of a tip interfacing with a sample surface at two points.

Next, as mentioned previously in conjunction with FIG. 9 (border regions "A" and "B"), when imaging particular types of features on samples, often times more than one point of a tip 180 having, for example, left and right boot-shaped sections, 183 and 185, respectively, may contact the sample surface 184 at the same time, as shown in FIG. 12 at points 186 and 188. In the event that such two point contact occurs, the slope of the acquired data (series of triangles) typically will change abruptly—(at about point 190 of the dilated data). In this case, as the scan continues (downwardly, left-to-right, at point 190), a shaft 181 of tip 180 continues to contact sample surface 184 at point 186, thus yielding the vertical data points shown. Notably, the corresponding reconstructed image (block-shaped points corresponding generally to the sample surface) also goes vertical starting at point 189. It is useful to identify any such occurrence of two-point contact in attempting to reconstruct the image of the sample surface from the dilated image data. By "flagging" such occurrences, the data can be further analyzed to determine whether additional portions of the tip can be removed from the image.

Notably, this abrupt change in slope (2nd derivative of Z with respect to X) that occurs at image data position 190 (FIG. 12) is an indicator of two (or more) point contact, and can only be created by this condition if measurement noise is not a factor, and the tip has not been damaged. This is due to the fact that the ideal (noiseless) image cannot measure any slope change greater than the maximum curvature of the probe tip. In general, assuming noise is negligible, the angle change at image data position 190 can serve as either a potential indicator of two (or more) point contact, or of probe damage that has resulted in a surface feature with sharp curvature.

To identify such instances of two-point contact, an additional method of the preferred embodiment may be implemented accordingly. This modification includes analyzing the history of the slopes determined as, for instance, in Step 92 of algorithm 80 (FIG. 7).

Figure 13:
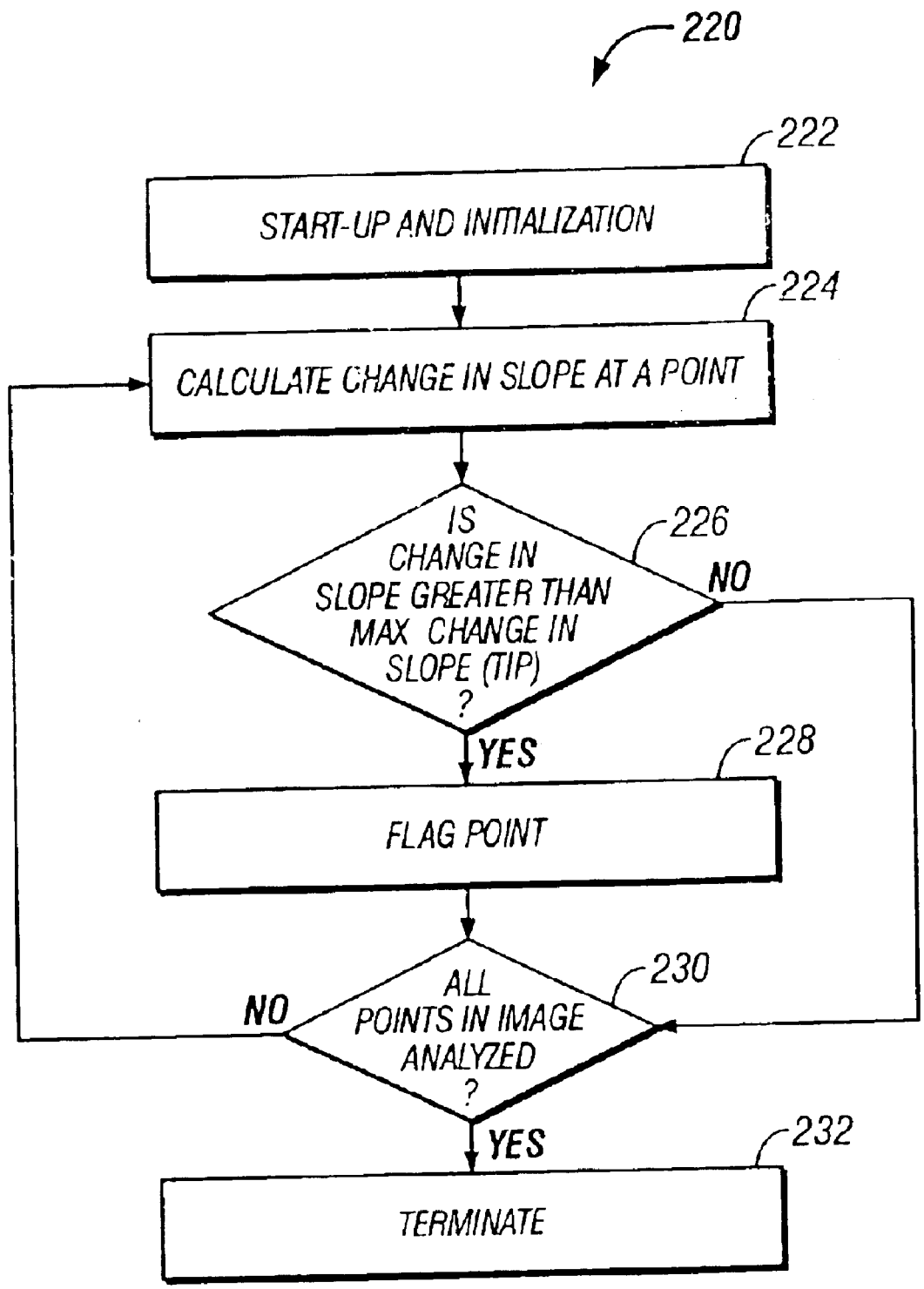
FIG. 13 is a flow diagram of a method according to the preferred embodiment, whereby two-point contact is identified.

Specifically, turning to FIG. 13, upon generating a reconstructed image according to either method 80 (FIG. 7) or 150 (FIG. 10), method 220 is employed to analyze the resulting data for two-point contact. After a start-up and initialization step, Step 222, the slopes associated with consecutive points in the reconstructed image are analyzed and a change in slope is or curvature (i.e., $\partial^2 z/\partial x^2$) computed in Step 224. The method then compares the change in slope with the maximum change in slope of the probe tip in Step 226. If the image point change in slope exceeds the maximum value, the point is flagged as an instance of possible two-point contact in Step 228. In Step 230, method 220 determines whether additional points need to be considered. If so, Steps 224-230 are repeated until no points remain. Of course, the algorithm is flexible in that not all data points need to be considered to generate a reconstructed image. The method then terminates in Step 232.

One way to determine whether there has been an abrupt change in slope (Step 226) is to determine whether the change in the slope (i.e., curvature) is greater than the maximum change in slope along the surface of the probe tip. The maximum change in slope along the surface of the probe tip can be determined upon characterizing the tip, for example, in Step 82 of method 80. In FIG. 12, at point 190 the unit surface normal transitions from approximately 315° relative to the scan or X direction to about 0° relative to the scan direction. Again, this is likely caused due to shaft 181 and boot-shaped section 183 of CD tip 180 contacting the sample surface at the same time. As the left-to-right scan continues in FIG. 12, the shaft continues to "bang" into the sidewall at about point 186, and thus the dilated data obtained goes essentially vertical, as one would expect when the vertical shaft is contacting the sample sidewall. In this case, the preferred embodiment may compute two correction factors to correct the dilated image point 190 to two reconstructed points, 188 (the correct reconstructed point), as well as point 195, the point (similar to left side of shaft 181, not characterized) which has a surface normal that is equal to and opposite the unit surface normal for vertical image data (i.e., the unit surface normal extending in the positive scan direction).

In the preferred embodiment, points 188 and 189 in FIG. 12 are connected by a straight line to produce the corrected image profile of the sample surface. However, using an enhancement technique, an image of more of the undercut region of the sample can be obtained. In particular, between points 188 and 189 illustrated in FIG. 12, it is known that the CD probe tip could have not contacted the undercut region between these points, and therefore one can provide a better approximation of that section of the undercut region by extracting the shape (2-D) or volume (3-D) of the probe between these two known points on the surface of the probe tip. For instance, the shape of tip 180 between points 188 and the point furthest to the left of the left side 183 of tip 180 could be extracted between points 188 and 189 of the reconstructed image to produce reconstructed surface 194 shown in phantom.

Improved Tip Width Correction

Figure 3A:
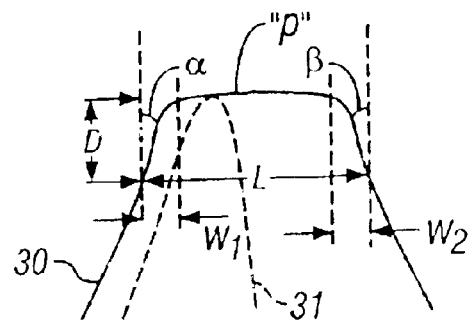
FIGS. 3A–3C illustrate calibration structures used to characterize a tip of a probe-based instrument, FIG. 3A including a plot of an AFM scan of a silicon nanoedge.
Figure 3B:
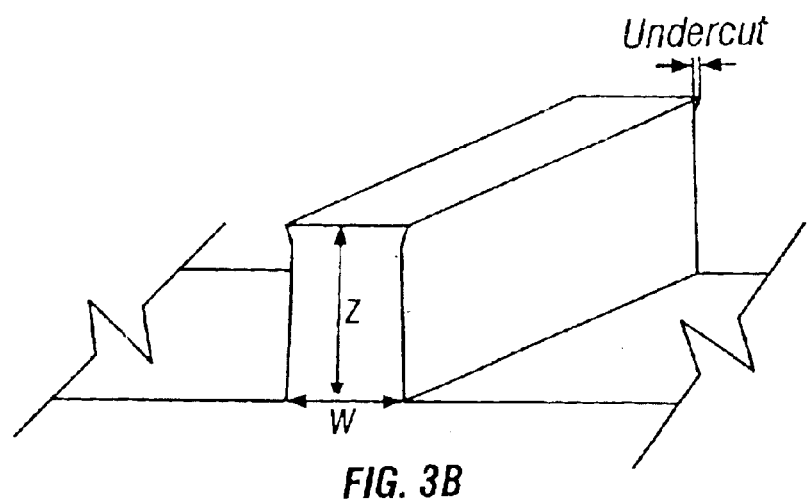
Figure 3C:
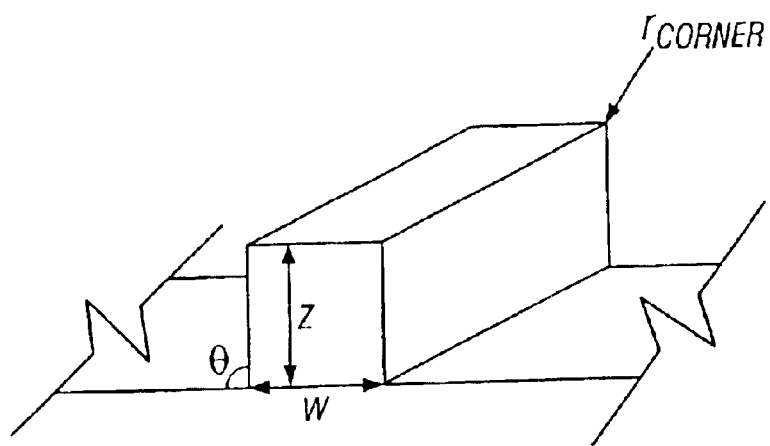
Figure 14:
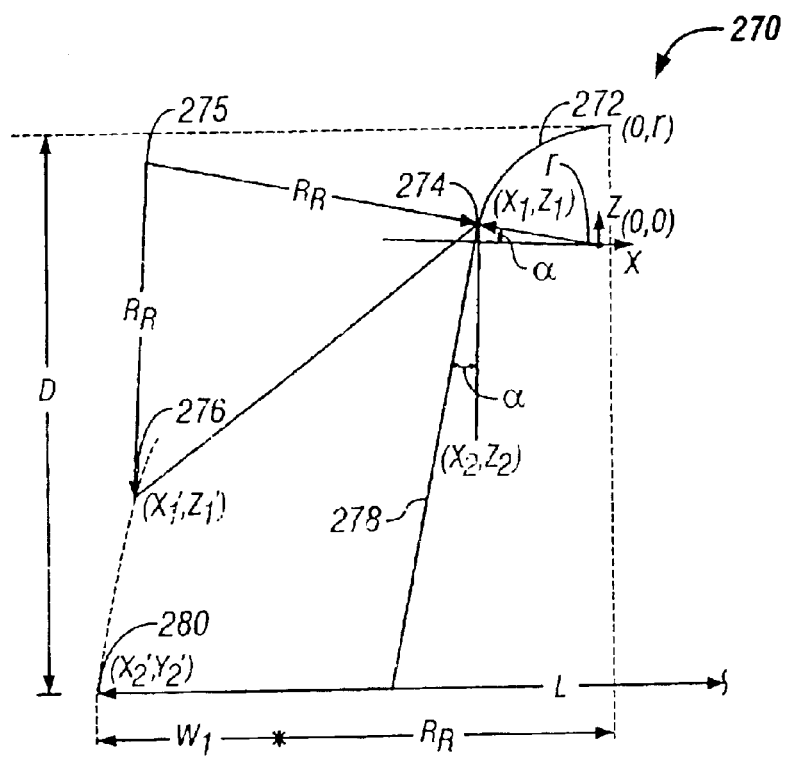
FIG. 14 is a side elevational schematic view illustrating an improved method of computing tip width.
Figure 14A:
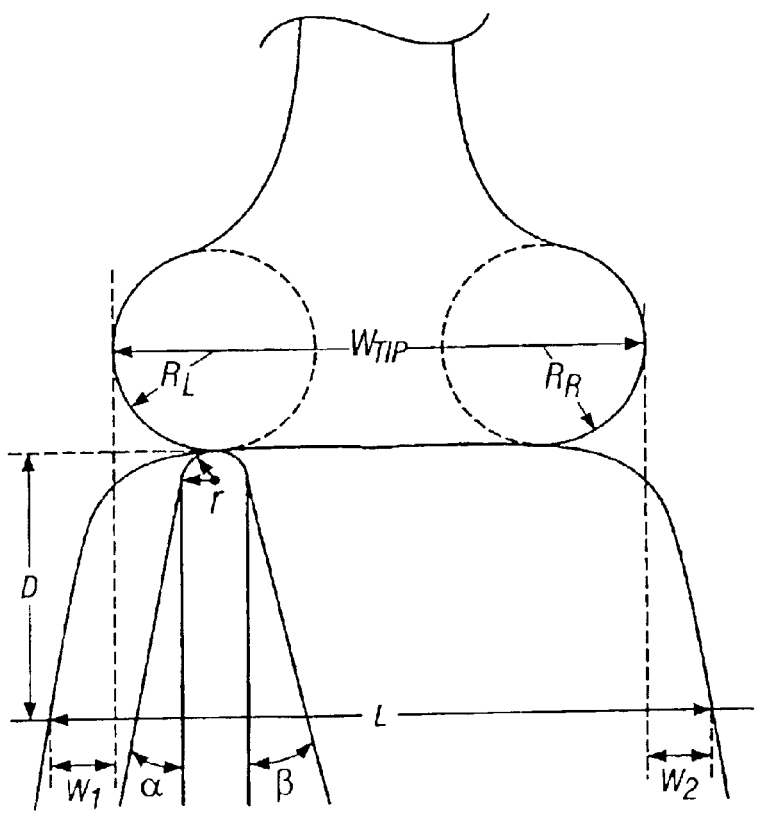
FIG. 14a is a side elevational schematic view similar to FIG. 3C, illustrating the geometry of the exact tip width equation of the preferred embodiment.

Turning to FIGS. 14 and 14a, which are similar to the silicon nanoedge and its profile shown in FIG. 3A, an improved silicon nanoedge (ISNE) is shown to illustrate how Equations 2 and 3 presented above have been improved to more accurately define the tip width of, for example, a CD tip. Again, Equations 2 and 3 presented previously are only accurate when the angles (alpha or beta) are essentially zero degrees. Again, because even the improved silicon nanoedge does not have perfectly vertical sidewalls, this assumption introduces error into the characterization of the tip width. An "exact" equation for the end corrections ($W_1$ and $W_2$ which are computed according to Equations 2 and 3 discussed previously) is presented below. However, an improved version of Equations 2 and 3 is first described.

In FIG. 14, the end corrections $W_1$ and $W_2$ can be computed with greater accuracy by accounting for the specification end radii, $R_R$ and $R_L$ associated with the tip in the computation. The specification and radii $R_R$ and $R_L$ are known, as they are provided by the manufacturer.

Rather than simply multiplying the tangent of the left and right side slope angles by the height "D" minus the radius of the ISNE (as done previously), in this embodiment the specification end radius radii is also subtracted from the height "D" to improve accuracy of the tip width computation. The new Equations for $W_1$ and $W_2$ are defined as follows, $$W_1 = (D - r - R_R) \tan \alpha + r \qquad \text{Equation 4}$$

$$W_2 = (D - r - R_L) \tan \beta + r \qquad \text{Equation 5}$$

Although providing an improvement over the prior art tip-width equations 2 and 3, an "exact" equation has been developed. Again, the prior art method described previously underestimates tip width for alpha greater than zero degrees, and thus underestimates CD feature size for a trench, or via, and overestimates CD feature side for a line, ridge, or contact, for example.

Similar to previous embodiments and the prior art, Equation 1 is utilized to determine the width of the tip with image and correction features ($W_1$, $W_2$), but the method of the preferred embodiment accounts for characteristics of ISNE that were heretofore not considered using an ISNE and CD and radii convolution set-up 270 shown in FIG. 14. In particular, when employing a CD tip having a known CD tip radius, Equations 2 and 3 (or alternatively, Equations 4 and 5), become, $$W_1 = ABS|-\cos(\alpha)(r+R_R) - \tan(\alpha)(D-r-R_R+\sin(\alpha)(r+R_R))+R_R| \qquad \text{Equation 6}$$

$$W_2 = \cos(\beta)(r+R_L) - \tan(\beta)(D-r-R_L+\sin(\beta)(R+R_L))-R_L \qquad \text{Equation 7}$$

Note that for the case of a vertical sidewall (i.e., $\alpha=0$ or $\beta=0$), equations 6 and 7 degenerate to $W_1=r$ and $W_2=r$, respectively.

More particularly, with reference to FIG. 14 illustrating the geometry of the above equation as a CD tip (not shown) is scanned over an ISNE 272, a first tip contact point 274 ($x_1, z_1$), at the tangency point between the sidewall and vertex radius, is defined as follows:

$$x_1 = -r \cos \alpha \qquad \text{Equation 8}$$

and $$z_1 = r \sin \alpha \qquad \text{Equation 9}$$

The point 276 ($x_1'$, $z_1'$), which is the position at the base of tip (e.g., "R" in FIG. 9) when at contact point 274, is defined as $$x_1 = \cos \alpha (r+R_R), \qquad \text{Equation 10}$$

and $$Z_1' = -R_R + \sin\alpha(r+R_R)$$ Equation 11

Using equations 10 and 11 and solving for $X_2'$, the "X" position at the base of tip when the contact point is at a second position 278, $W_1$ (FIG. 3A) can be solved for the right radius of the CD tip, $R_R$. $W_2$ is solved the same way for the left side radius, $R_L$.

Figure 15:
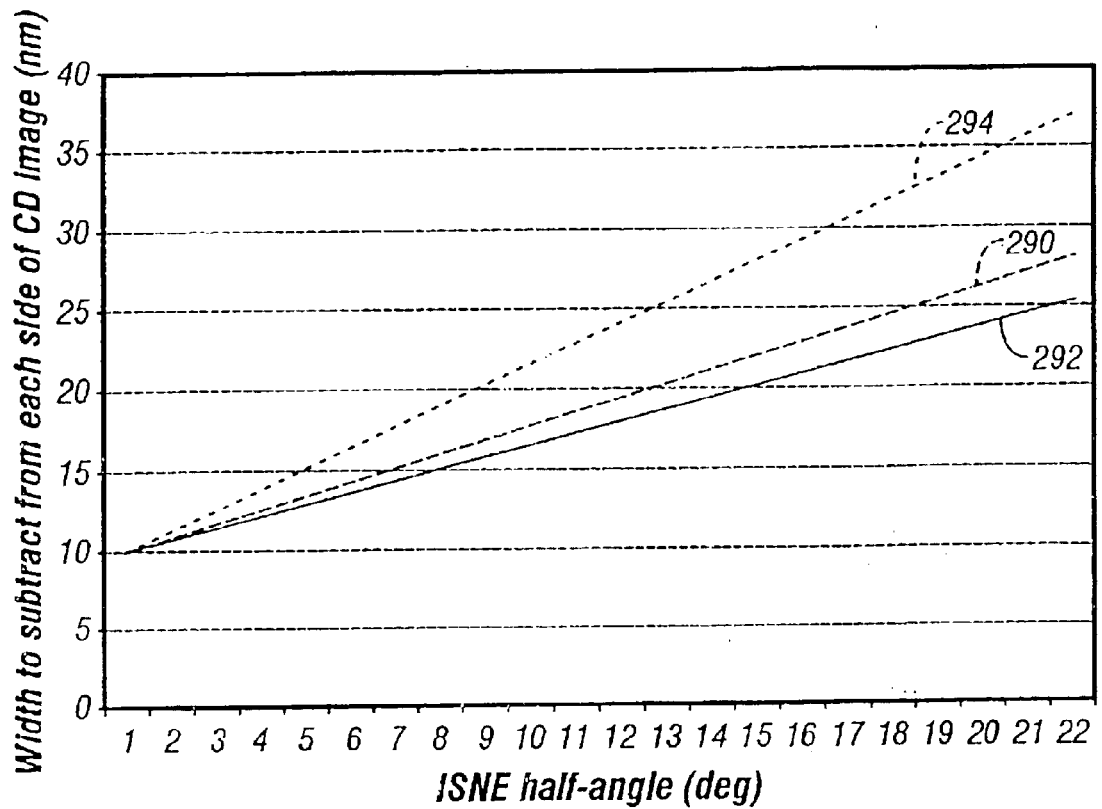
FIG. 15 is a graph illustrating a comparison of the exact equation, the improved equation and the prior art equation for performing tip width correction.

To reiterate, the dimension "L" is the width of the image at the Z distance "D" from the plateau of the scanned image, while tip width ($W_{tip}$) equals $L-(W_1+W_2)$. And, $R_L$ and $R_R$ are the radii of the left and right sides of the CD tip (measured from the appropriate tip center point, point 275 for right side), respectively, and r is the radius of ISNE 272. The exact equation for the tip-width (Equation 1 with end corrections computed as in Equations 6 and 7) yields significantly greater accuracy when performing tip-width correction analysis on dilated AFM data, as shown in FIG. 15 which provides a graphical comparison of the exact equation (plot 290), the improved equation (plot 292), and the prior art equation (plot 294). In this case, the ISNE radius is 10 nm, the $R_L$ and $R_R$ end radii are 30 nm, and the vertical height (D) for measurement is 80 nm. As shown, the prior art equation overestimates the tip-width to be subtracted for angles greater than 0°, and does so to a greater extent than the improved equation underestimates the tip width.

The scope of the present invention is not limited to the geometry of the ISNE (or SNE) structure. For example, characterization of the CD tip width could use the sample convolution of the tip radii, characterizer radius (or radii) and sidewall angles in the use of a line or contact, or the upper corners of a trench or via.

In the case of a line, the line may be viewed as an ISNE with an additional horizontal section which expands the ISNE at the vertex to a horizontal plateau. The width of the line can be either measured or provided in standard specifications. The two upper corners of the line may either have the same or different radii. Similarly, the same relationships apply to the trench, and the three dimensional analogs of the line and trench (namely, the contact and via, respectively).

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method of extracting the shape of a tip of a probe-based instrument from data obtained by the instrument, the method comprising the steps of:

generating an image using the data, the data being indicative of a characteristic of a surface of a sample;

calculating a slope of the image at a particular region;

and determining, using the slope, a probe contact point between the tip and the sample surface at the region, wherein the determining a probe contact point step includes calculating a vector associated with the slope, and wherein, the vector defines a direction of scanning.

2. The method of claim 1, further comprising the step of translating the image point based on the probe contact point.

3. The method of claim 2, further comprising the step of repeating the above steps for at least two points in the image data so as to generate a corrected image plot.

4. The method of claim 1, further comprising the step of smoothing the image prior to the calculating a slope step.

5. The method of claim 1, further comprising the step of identifying a region of the image where there are at least two points of contact.

6. The method of claim 5, wherein the step of identifying a region of the image includes comparing a local curvature of the image to a maximum curvature of the tip.

7. The method of claim 6, wherein the region of at least two points of contact is where the local curvature exceeds the maximum curvature.

8. A method of extracting the shape of a tip of a probe-based instrument from data obtained by the instrument, the method comprising the steps of:

generating an image using the data, the data being indicative of a characteristic of a surface of a sample;

calculatine a slope of the image at a particular region; and determining, using the slope, a probe contact point between the tip and the sample surface at the region, wherein the determining step includes identifying a unit surface normal to the sample at the region.

9. The method of claim 8, wherein the determining step further includes comparing the unit surface normal to tip surface normals associated with at least two points on an active surface of the tip.

10. The method of claim 9, further comprising the steps of:

repeating the previous steps for a plurality of points of the data wherein each unit surface normal has at least one associated correction factor; and using the correction factors to generate a reconstructed image.

11. The method of claim 10, wherein the at least one associated correction factor for each unit surface normal is identified by comparing a surface angle of the unit surface normal with respect to a reference to tip angles that the corresponding tip surface normals make with respect to the reference.

12. The method of claim 11, wherein the at least one associated correction factor is identified when at least one of the tip angles is displaced 180 degrees with respect to the surface angle.

13. The method of claim 12, wherein the reference is the scan direction.

14. The method of claim 10, wherein the correction factors are correction vectors, and the using step includes applying the correction vectors to the corresponding data points.

15. The method of claim 14, wherein the applying step includes computing the correction vector according to an equation.

16. The method of claim 8, wherein the unit surface normal is directed away from the interior of the sample.

17. A method of correcting tip shape error in data obtained by a scanning probe microscope (SPM) having a tip, the method comprising the steps of:

using the SPM to generate the data, the data being indicative of a characteristic of a surface of a sample;

determining a probe contact point of the tip on the sample at a point of the data;

and wherein the determining step includes calculating a vector associated with the contact point, and wherein the vector defines a direction of scanning.

18. A method of correcting tip shape error in data obtained by a scanning probe microscope (SPM) having a tip, the method comprising the step of:

using the SPM to generate the data, the data being indicative of a characteristic of a surface of a sample; and determining a probe contact point of the tip on the sample at a point of the data,
wherein the determining step includes identifying a unit surface normal to the sample at the data point.

19. The method of claim 18, wherein the identifying step includes computing a slope at the data point.

20. The method of claim 19, wherein the determining step further includes comparing the unit surface normal to tip surface normals associated with at least two points on an active surface of the tip.

21. The method of claim 20, wherein the unit surface normal corresponds to a first tip surface normal.

22. The method of claim 21, wherein the tip surface normals each have an associated correction factor, and further comprising translating the data point using the correction factor corresponding to the first tip surface normal.

23. The method of claim 21, wherein the correction factor is a correction vector.

24. The method of claim 20, wherein the tip surface normals are non-unique such that the unit surface normal corresponds to at least two of the tip surface normals.

25. The method of claim 24, wherein the tip surface normals each have an associated correction factor, and further comprising the step of translating the data point using each of the correction factors associated with the at least two tip surface normals.

26. The method of claim 25, further comprising the step of repeating each of the previous steps for at least two data points in a profile generated using the data so as to generate a first reconstructed image profile.

27. The method of claim 26, further comprising the step of filtering the first reconstructed image profile so as to generate a second reconstructed image profile.

28. The method of claim 27, wherein the filtering step includes selecting a point of the first reconstructed image profile that has a minimum Z height for at least two of the scan positions in the first reconstructed image profile.

29. The method of claim 20, further comprising the steps of:
repeating the previous steps for a plurality of points of the data, wherein each unit surface normal has at least one associated correction factor, and;
using the correction factors to generate a reconstructed image.

30. The method of claim 29, wherein the at least one associated correction factor for each unit surface normal is identified by comparing a surface angle of the unit surface normal with respect to a reference to tip angles that the corresponding tip surface normals make with respect to the reference.

31. The method of claim 30, wherein the at least one associated correction factor is identified when at least one of the tip angles is displaced 180 degrees with respect to the surface angle.

32. The method of claim 30, wherein the reference is a scan direction.

33. The method of claim 29, wherein the at least one associated correction factor for each unit surface normal is identified by comparing first and second surface angles of the unit surface normal relative to a reference to first and second tip angles that the corresponding tip surface normals make with respect to the reference.

34. The method of claim 29, wherein the correction factors are correction vectors, and the using step includes applying the correction vectors to the corresponding data points.

35. The method of claim 34, wherein the applying step includes computing the correction vector according to an equation.

36. The method of claim 18, wherein the unit surface normal is directed away from the interior of the sample.

37. The method of claim 29, further comprising identifying a point of two-point contact.

38. The method of claim 37, wherein the identifying a point of two-point contact step includes determining a change in the slope for at least two pairs of consecutive data points.

39. The method of claim 38, wherein the point of two-point contact is where any one of the computed changes is greater than a maximum curvature of the tip.

40. The method of claim 25, wherein the correction factors are correction vectors.

41. The method of claim 24, wherein the tip is a CD tip.

42. The method of claim 18, further comprising the step of translating the data point based on the contact point.

43. The method of claim 42, wherein the contact point has an associated correction vector, and the data point is translated by an amount defined by the associated correction vector.

44. A method of correcting tip shape error in data obtained by a probe-based instrument having a tip, the method comprising the steps of:
using the instrument to scan a sample and generate the data, the data being indicative of a characteristic of a surface of the sample and including a plurality of data points;
determining a contact point of the tip for one or more data point of the plurality of data points;
and determining a correction factor for the one or more of the data points using the corresponding contact point,
wherein the step of determining the correction factor includes calculating a vector associated with the slope, and wherein the vector defines a direction of scanning.

45. The method of claim 44, further comprising the step of using the correction factor to generate a first reconstructed image.

46. The method of claim 45, further comprising the step of filtering the first reconstructed image to generate a second reconstructed image.

47. A method of correcting the tip shape error in data obtained by a probe-based instrument having a tip, the method comprising the steps of:
using the instrument to scan a sample and generate the data, the data being indicative of a characteristic of a surface of the sample and including a plurality of data points,
determining a contact point of the tip for one or more data point of the plurality of data points;
determining a correction factor for the one or more of the data points using the corresponding contact point;
using the correction factor to generate a first reconstructed image; and
filtering the first reconstructed image to generate a second reconstructed image, wherein the filtering step is a minimum filtering step.

48. A method of removing a shape of a tip of a probe-based instrument from data obtained by the instrument, the method comprising the steps of:
using specification end radii of the tip to compute first and second end corrections; and
correcting the data by subtracting a width of the tip, the width being dependent upon the first and second end corrections.

49. The method of claim 48, wherein the using step includes accounting for non-vertical side walls of a silicon nanoedge, the silicon nanoedge being used to compute the first and second end corrections.

50. The method of claim 48, wherein the first and second end corrections, $W_1$ and $W_2$, are equal to, $$W_1 = ABS|-\cos(\alpha)(r+R_L) - \tan(\alpha)(D-r-R_L+\sin(\alpha)(r+R_L))+R_L|$$

$$W_2 = \cos(\beta)(r+R_R) - \tan(\beta)(D-r-R_R+\sin(\beta)(R+R_R))-RR$$

wherein "r" the radius of the silicon nanoedge, "D" is a z distance from a plateau of a scanned image, alpha is an angle computed from a left side slope, beta is an angle computed from a right side slope, and $R_l$ and $R_r$ are the radii of the left and right sides of the tip, respectively.

51. A method of correcting tip shape error in data obtained by a probe-based instrument having a tip, the method comprising the steps of:

using the instrument to scan a sample and generate the data, the data being indicative of a characteristic of a surface of the sample and including a plurality of data points, wherein the data represents a mathematical surface;

determining a normal vector of the mathematical surface at one or more data points; and using the normal vector to determine a correction factor for the corresponding data points.

52. A method of correcting tip shape error in data obtained by a probe-based instrument having a tip, the method comprising the steps of:

measuring the tip in an electron microscope so as to create an image of the tip; and determining a width and a tangent angle of the tip in the image at one or more points.

53. The method of claim 52, further comprising the step of storing the tip width and the tangent angle in a look-up table.

54. The method of claim 53, further comprising the step of using the look-up table to correct the data.

55. The method of claim 52, further comprising the step of fitting a mathematical equation to the tip width and tangent angle measurements.

56. The method of claim 55, further comprising the step of using the look-up table to correct the measured data.

57. A method of creating a model of an SPM tip, the method comprising the steps of:

measuring a generally known reference sample with the SPM tip to generate an SPM image;

measuring a dimension and at least one tangent angle of the SPM tip at one or more corresponding points on a surface of the SPM tip using the SPM image; and determining a normal vector at the one or more points on the surface of the SPM tip.

58. The method of claim 57, wherein the reference sample is an ISNE.

59. The method of claim 57, wherein the at least one tangent angle in three dimensional X-Y-Z space includes a first tangent angle relative to a direction of scanning, and a second tangent anile relative to an X-Y plane.

60. A method of creating a model of an SPM tip, the method comprising the steps of:

measuring a generally known reference sample with the SPM tip to generate an SPM image;

measuring a dimension and at least one tangent angle of the SPM tip at one or more corresponding points on a surface of the SPM tip using the SPM image: and storing the dimensions and the tangent angles of the one or more corresponding points in a look-up table.

61. The method of claim 57, wherein the dimension is measured relative to a tip reference point used to generate the SPM image.

62. A method of extracting the shape of a tip of a probe-based instrument from data obtained by the instrument, the method comprising the steps of:

generating an image using the data, the data being indicative of a characteristic of a surface of a sample and corresponding to a plurality of scan positions of the sample;

calculating a slope of the image at a first scan position, wherein the first scan position includes a plurality of data points; and determining, using the slope, a probe contact point between the tip and the sample surface at the first scan position.

* * * * *

UNITED STATES PATENT AND TRADEMARK OFFICE
CERTIFICATE OF CORRECTION

| | | |
|---|---|---|
| PATENT NO. | : 6,810,354 B1 | Page 1 of 1 |
| APPLICATION NO. | : 10/139949 | |
| DATED | : October 26, 2004 | |
| INVENTOR(S) | : Gregory A. Dahlen | |

It is certified that error appears in the above-identified patent and that said Letters Patent is hereby corrected as shown below:

<u>IN THE CLAIMS</u>

Column 20, line 14, delete "calculatine" and substitute therefore -- calculating --.
Column 24, line 15, delete "anile" and substitute therefore -- angle --.

Signed and Sealed this

Eleventh Day of July, 2006

JON W. DUDAS
*Director of the United States Patent and Trademark Office*